(12) United States Patent
Wagner

(10) Patent No.: US 10,632,983 B2
(45) Date of Patent: Apr. 28, 2020

(54) CONTROL DEVICE AND METHOD FOR OPERATING A HYDRAULIC BRAKING SYSTEM OF A VEHICLE

(71) Applicant: Robert Bosch GmbH, Stuttgart (DE)

(72) Inventor: Jens Wagner, Untergruppenbach (DE)

(73) Assignee: Robert Bosch GmbH, Stuttgart (DE)

(*) Notice: Subject to any disclaimer, the term of this patent is extended or adjusted under 35 U.S.C. 154(b) by 24 days.

(21) Appl. No.: 16/031,666

(22) Filed: Jul. 10, 2018

(65) Prior Publication Data

US 2019/0016324 A1 Jan. 17, 2019

(30) Foreign Application Priority Data

Jul. 12, 2017 (DE) .................. 10 2017 211 877

(51) Int. Cl.
| | |
|---|---|
| *B60T 8/40* | (2006.01) |
| *B60T 13/68* | (2006.01) |
| *B60T 7/04* | (2006.01) |
| *B60T 13/66* | (2006.01) |
| *B60T 17/16* | (2006.01) |
| *B60T 13/74* | (2006.01) |
| *B60T 13/14* | (2006.01) |

(Continued)

(52) U.S. Cl.
CPC ............ *B60T 13/686* (2013.01); *B60T 7/042* (2013.01); *B60T 8/17* (2013.01); *B60T 8/1766* (2013.01); *B60T 8/17616* (2013.01); *B60T 8/409* (2013.01); *B60T 8/4081* (2013.01); *B60T 13/145* (2013.01); *B60T 13/146* (2013.01); *B60T 13/662* (2013.01); *B60T 13/745* (2013.01); *B60T 17/16* (2013.01)

(58) Field of Classification Search
CPC .............. B60T 8/4081; B60T 2270/82; B60T 2270/404; B60T 8/4086; B60T 8/409; B60T 8/4208; B60T 7/042
USPC ...................................................... 303/116.2
See application file for complete search history.

(56) References Cited

U.S. PATENT DOCUMENTS

| | | | |
|---|---|---|---|
| 2015/0061854 A1* | 3/2015 | Drumm ................... | B60T 7/042 340/453 |
| 2017/0225664 A1* | 8/2017 | Beever .................... | B60T 7/042 |

(Continued)

FOREIGN PATENT DOCUMENTS

DE    102014225539 A1    6/2016

*Primary Examiner* — Nicholas J Lane
(74) *Attorney, Agent, or Firm* — Norton Rose Fulbright US LLP; Gerard Messina

(57) ABSTRACT

A control device for a vehicle hydraulic braking system, including an electronic device for transferring brake fluid into at least one wheel brake cylinder without a force transmission connection to the brake actuating element, or that is hydraulically decoupleable from the brake actuating element, with a motorized brake pressure buildup device; ascertaining whether wheel locking of at least one wheel of the vehicle that is braked with the at least one wheel brake cylinder is present or at risk; temporarily effectuating, at least at times, a counterforce on the brake actuating element acting against the actuation of the brake actuating element by the driver when it is ascertained that wheel locking is present or at risk and/or when the electronic brake force distribution function and/or the antilocking function are/is executed. Also described is a hydraulic braking system for a vehicle, and a method for operating such a braking system.

9 Claims, 3 Drawing Sheets

(51) Int. Cl.
*B60T 8/1761* (2006.01)
*B60T 8/17* (2006.01)
*B60T 8/1766* (2006.01)

(56) References Cited

U.S. PATENT DOCUMENTS

| | | | |
|---|---|---|---|
| 2018/0065606 A1* | 3/2018 | Brok | B60T 8/32 |
| 2018/0229702 A1* | 8/2018 | Son | B60T 8/4086 |
| 2019/0001946 A1* | 1/2019 | Alemanno | B60T 7/042 |

* cited by examiner

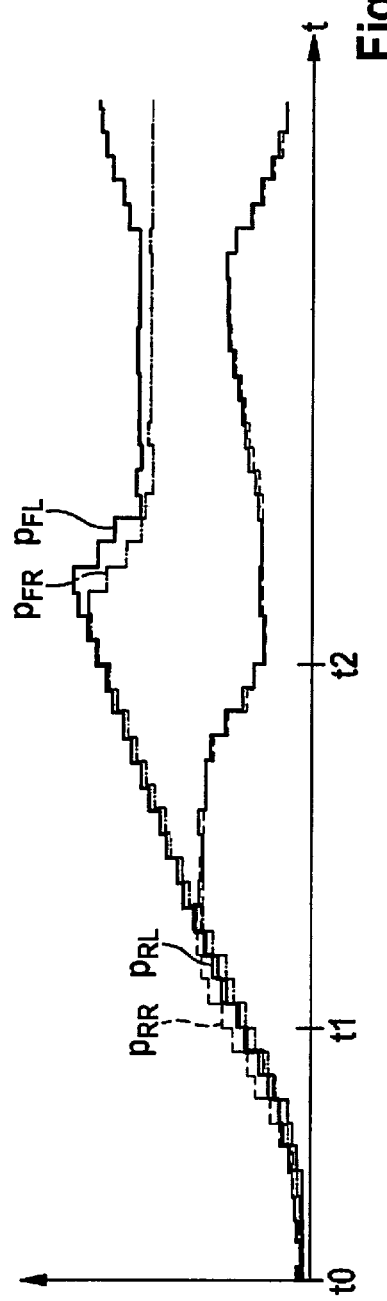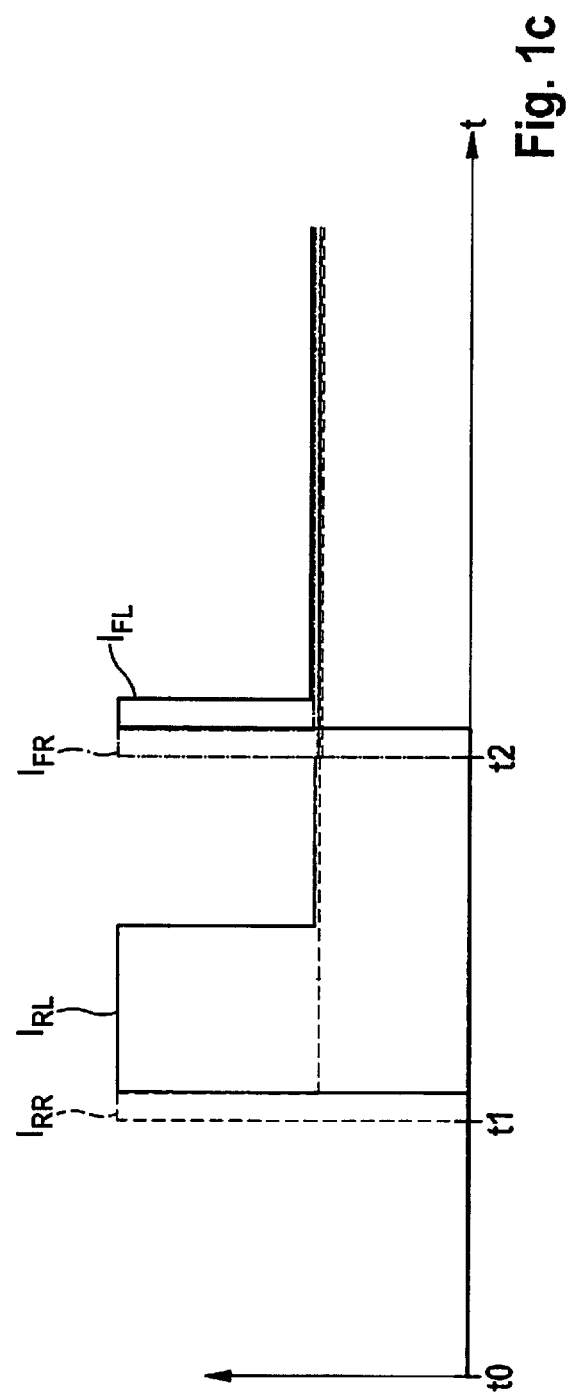

CONTROL DEVICE AND METHOD FOR OPERATING A HYDRAULIC BRAKING SYSTEM OF A VEHICLE

RELATED APPLICATION INFORMATION

The present application claims priority to and the benefit of German patent application no. 10 2017 211 877.6, which was filed in Germany on Jul. 12, 2017, the disclosure which is incorporated herein by reference.

FIELD OF THE INVENTION

The present invention relates to a control device for a hydraulic braking system of a vehicle. Moreover, the present invention relates to a hydraulic braking system for a vehicle.

Furthermore, the present invention relates to a method for operating a hydraulic braking system of a vehicle.

BACKGROUND INFORMATION

Patent document DE 10 2014 225 539 A1 discusses a braking system for a vehicle which is usable as a power braking system. When a driver of the vehicle brakes into a master brake cylinder of the braking system, the brake pressure in wheel brake cylinders of the braking system may be increased with the aid of a motorized piston-cylinder device. In addition, the aim is to make it possible for locking of at least one wheel associated with the wheel brake cylinders to be eliminated with the aid of an antilocking function executed by the motorized piston-cylinder device.

SUMMARY OF THE INVENTION

The present invention provides a control device for a hydraulic braking system of a vehicle having the features described herein, a hydraulic braking system for a vehicle having the features described herein, and a method for operating a hydraulic braking system of a vehicle having the features described herein.

The present invention provides options for effectuating tactile noticeability of wheel locking that is present or at risk, an executed electronic brake force distribution function, and/or an executed antilocking function, by a driver. In the situations listed above, the driver, who actuates the brake actuating element/brake pedal, senses the counterforce as a pressure point. Thus, even during operation of the hydraulic braking system in a "power brake mode," the driver has a standard brake actuating feel/pedal feel of a conventional braking system (which is not configured as a power braking system). In addition, with the aid of the counterforce which is perceivable/noticeable by the driver, he/she may be induced to optimize the actuation of the brake actuating element/brake pedal with regard to the wheel locking that is present or at risk, the executed electronic brake force distribution function, and/or the executed antilocking function, in particular to request (at least for a temporary period) a lesser deceleration of the vehicle. The present invention thus also contributes to improvement in the braking behavior of drivers.

As will become apparent from the following description, utilization/implementation of the present invention does not require hardware changes or design changes to a number of conventional braking systems configured as power braking systems. Instead, the present invention may often be implemented by appropriately adapting control unit software. Use/utilization of the present invention is therefore comparatively inexpensive, and makes little or no contribution to an increase in the space requirements of the particular hydraulic braking system used for this purpose.

In one advantageous specific embodiment of the control device, the counterforce on the brake actuating element acting against the actuation of the brake actuating element by the driver is at least partially triggerable by a design of the electronic device in which a simulator may be temporarily decoupled from the brake actuating element. The driver, who brakes into the simulator by actuating the brake actuating element beforehand, easily perceives the counterforce that is triggered by the decoupling of the simulator from the brake actuating element.

Alternatively or additionally, the electronic device may be configured for switching at least one shutoff valve of the hydraulic braking system in such a way that the at least one wheel brake cylinder is decoupleable from a master brake cylinder to which the brake actuating element is directly or indirectly connected, and from the brake actuating element, by closing the at least one shutoff valve, and that the counterforce on the brake actuating element acting against the actuation of the brake actuating element by the driver is at least partially triggerable by temporarily opening the at least one shutoff valve. Since the at least one shutoff valve that is also used in this specific embodiment of the control device is generally already present in a hydraulic braking system that is usable as a power braking system, the specific embodiment of the control device described here may cooperate with numerous conventional hydraulic braking systems.

For example, the electronic device may be configured for only temporarily opening the at least one shutoff valve, when it is ascertained that wheel locking is present or at risk and/or if the electronic brake force distribution function and/or the antilocking function are/is executed, only if the at least one brake pressure in the at least one wheel brake cylinder of the hydraulic braking system, provided at the electronic device or by the electronic device, is above an estimated master brake cylinder pressure in the master brake cylinder, provided at the electronic device or by the electronic device. This automatically ensures that the temporary opening of the at least one shutoff valve results in an (at least momentary) pressure increase in the master brake cylinder, and thus, in a counterforce that is perceivable/noticeable to the driver.

As one advantageous refinement of the control device, the electronic device may also be configured, if it is ascertained that wheel locking is present or at risk and/or if the electronic brake force distribution function and/or the antilocking function are/is executed, for producing the counterforce on the brake actuating element acting against the actuation of the brake actuating element by the driver, only if an actual value concerning an actuating speed of the actuation of the brake actuating element by the driver is within a predefined normal value range. The normal value range may be predefined in such a way that the actual value is outside the normal value range only if a limiting speed is exceeded during the actuation of the brake actuating element. In this way, the electronic device may reliably determine whether the actuation of the brake actuating element by the driver is to be attributed to an emergency and/or panic brake application, and optionally, rapidly bringing the driver's vehicle to a standstill may be simplified for the driver by dispensing with the counterforce acting against the actuation of the brake actuating element.

The above-described advantages are also achieved with a hydraulic braking system for a vehicle that includes at least one such control device, the motorized brake pressure buildup device, the brake actuating element, and the at least one wheel brake cylinder that is configured without the force transmission connection to the brake actuating element, or that is hydraulically decoupleable from the brake actuating element.

In addition, carrying out a corresponding method for operating a hydraulic braking system of a vehicle yields the advantages described above. It is expressly pointed out that the method for operating a hydraulic braking system of a vehicle may be refined according to the specific embodiments of the control device explained above.

Further features and advantages of the present invention are explained below with reference to the figures.

BRIEF DESCRIPTION OF THE DRAWINGS

FIGS. 1a, 1b, and 1c show a flow chart and two coordinate systems for explaining one specific embodiment of the method for operating a hydraulic braking system of a vehicle.

DETAILED DESCRIPTION

Figure 1A:
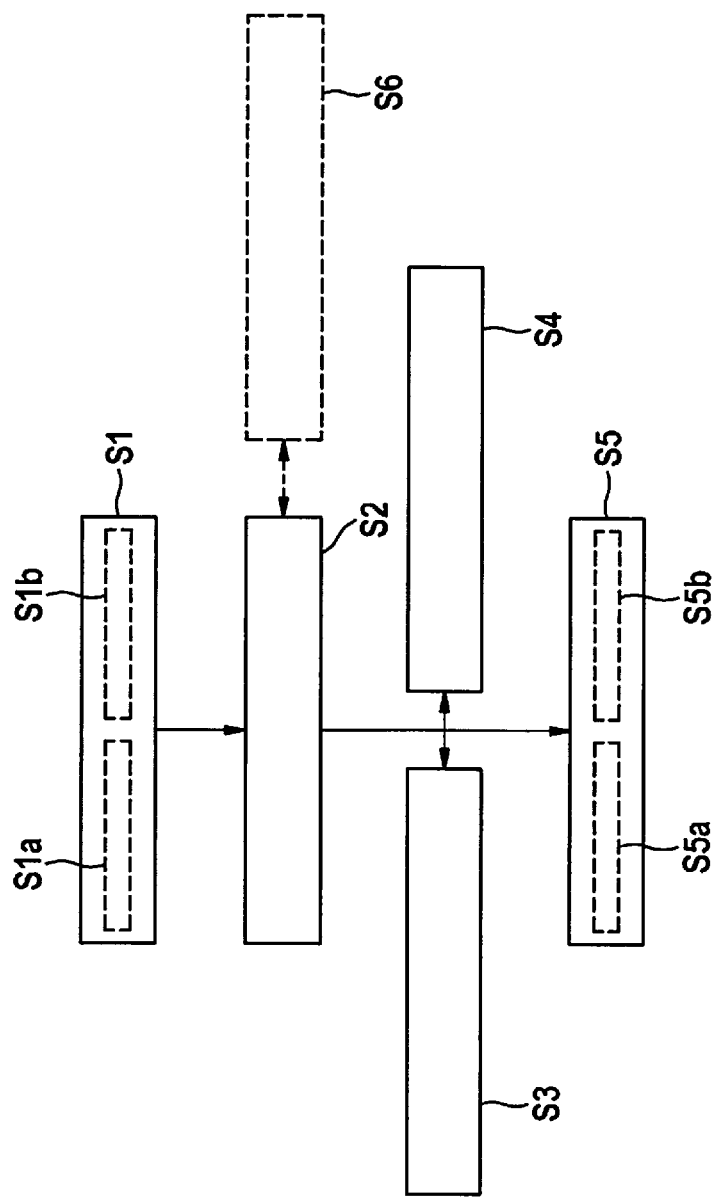

FIGS. 1a through 1c show a flow chart and two coordinate systems for explaining one specific embodiment of the method for operating a hydraulic braking system of a vehicle.

It is expressly pointed out that the implementability of the method described below is not limited to a specific type of vehicle/motor vehicle equipped with the hydraulic braking system. Furthermore, the implementability of the method is not limited to a specific type of hydraulic braking system.

The hydraulic braking system may be operated in a so-called power braking mode with the aid of the method described here. For this purpose, the method includes a method step S1 which is carried out by a driver of the vehicle during an actuation of a brake actuating element (a brake pedal, for example). With the aid of method step S1, at least one brake pressure $p_{FL}$, $p_{FR}$, $p_{RL}$, $p_{RR}$ is increased in at least one wheel brake cylinder of the hydraulic braking system, although the at least one wheel brake cylinder is configured without a force transmission connection to the brake actuating element or is hydraulically (actively) decoupled from the brake actuating element.

A (structural) design of the at least one wheel brake cylinder without the force transmission connection to the brake actuating element is understood to mean, for example, that there is no force transmission connection between the brake actuating element and a hydraulic system (which includes the at least one wheel brake cylinder) of the hydraulic braking system. In this case, the brake actuating element is used solely for ascertaining a driver braking intent that is indicated by actuation by the driver, and not for the driver to brake into the hydraulic system of the hydraulic braking system, i.e., for increasing pressure in the hydraulic braking system with the aid of the driver braking force exerted on the brake actuating element by the driver. (Such a hydraulic braking system may be referred to as a power braking system, in particular without a by-wire design.)

The at least one wheel brake cylinder that is hydraulically (actively) decoupled from the brake actuating element may be understood in particular to mean that at least one hydraulic connection between the at least one wheel brake cylinder and a pressure converter component of the hydraulic braking system, in which the driver brakes by actuating the brake actuating element/the driver braking force, is temporarily (actively) interrupted. The pressure converter component of the hydraulic braking system is generally a master brake cylinder of the hydraulic braking system. The at least one wheel brake cylinder may be hydraulically (actively) decoupled from the brake actuating element by closing at least one shutoff valve that is situated/connected between the pressure converter component/the master brake cylinder and the at least one wheel brake cylinder. (The type of braking system described in this paragraph is often referred to as a by-wire braking system.)

In method step S1, the at least one brake pressure $p_{FL}$, $p_{FR}$, $p_{RL}$, $p_{RR}$ in the at least one wheel brake cylinder (configured without the force transmission connection to the brake actuating element or hydraulically decoupled from the brake actuating element) is increased by transferring brake fluid into the at least one wheel brake cylinder with the aid of a motorized brake pressure buildup device of the hydraulic braking system. The motorized brake pressure buildup device may include, for example, a motorized piston-cylinder device (motorized plunger device) and/or at least one pump/return pump of the hydraulic braking system. Thus, despite the design of the at least one wheel brake cylinder without the force transmission connection to the brake actuating element, or despite the temporary hydraulic decoupling of the at least one wheel brake cylinder from the brake actuating element, method step S1 effectuates an increase in the at least one brake pressure $p_{FL}$, $p_{FR}$, $p_{RL}$, $p_{RR}$ in the at least one wheel brake cylinder. The increase in the at least one brake pressure $p_{FL}$, $p_{FR}$, $p_{RL}$, $p_{RR}$ in the at least one wheel brake cylinder with the aid of the motorized brake pressure buildup device may in particular take place corresponding to the driver braking intent indicated by actuating the brake actuating element.

The abscissa is a time axis t in the coordinate system in FIG. 1b. The ordinate of the coordinate system in FIG. 1b represents the at least one brake pressure $p_{FL}$, $p_{FR}$, $p_{RL}$, $p_{RR}$ in the at least one wheel brake cylinder (i.e., a brake pressure $p_{FL}$ in a "left" front wheel brake cylinder associated with a left front wheel, a brake pressure $p_{FR}$ in a "right" front wheel brake cylinder associated with a right front wheel, a brake pressure $p_{RL}$ in a "left" rear wheel brake cylinder associated with a left rear wheel, and a brake pressure $p_{RR}$ in a "right" rear wheel brake cylinder associated with a right rear wheel).

Beginning at a point in time t0, the driver actuates the brake actuating element, and the at least one brake pressure $p_{FL}$, $p_{FR}$, $p_{RL}$, $p_{RR}$ in the at least one wheel brake cylinder is increased by carrying out method step S1. As an example, as substep S1a at point in time t0 (and prior to transferring brake fluid with the aid of the motorized brake pressure buildup device), the at least one wheel brake cylinder is decoupled from the master brake cylinder, into which the driver brakes by actuating the brake actuating element, and (thus) from the brake actuating element, by closing the at least one shutoff valve. Optionally, as substep S1b, a simulator shutoff valve (situated/connected between the master brake cylinder and a simulator) may also be opened at point in time t0, so that the driver braking into the master brake cylinder, by "co-braking" into the simulator, has a pleasant brake actuating feel/pedal feel.

A method step S2 is also carried out at least once during method step S1. It is ascertained in method step S2 whether wheel locking of at least one wheel of the vehicle that is braked with the aid of the at least one wheel brake cylinder is present or at risk. This takes place, for example, by measuring and/or estimating the at least one brake pressure $p_{FL}$, $p_{FR}$, $p_{RL}$, $p_{RR}$ in the at least one wheel brake cylinder. A coefficient of friction of a roadway on which the vehicle/motor vehicle is traveling at the moment may also be taken into account when ascertaining whether wheel locking is present or at risk. (Since processes for ascertaining the presence of wheel locking and/or the likelihood of occurrence of wheel locking are known, a more detailed discussion is not provided here.)

If it is ascertained in method step S2 (for example, taking into account the at least one estimated or measured brake pressure $p_{FL}$, $p_{FR}$, $p_{RL}$, $p_{RR}$ in the at least one wheel brake cylinder) that wheel locking is present or at risk, an electronic brake force distribution function (method step S3) and/or an antilocking function (method step S4) are/is executed.

Method steps S3 and S4 are generally carried out by switching at least one wheel inlet valve situated upstream from the at least one wheel brake cylinder. The abscissa of the coordinate system in FIG. 1c indicates time axis t, while the ordinate of the coordinate system in FIG. 1c indicates at least one switching current $I_{FL}$, $I_{FR}$, $I_{RL}$, $I_{RR}$ (i.e., a switching current $I_{FL}$ of a "left" front wheel inlet valve associated with the "left" front wheel brake cylinder, a switching current $I_{FR}$ of a "right" front wheel inlet valve associated with the "right" front wheel brake cylinder, a switching current $I_{RL}$ of a "left" rear wheel inlet valve associated with the "left" rear wheel brake cylinder, and a switching current $I_{RR}$ of a "right" rear wheel inlet valve associated with the "right" rear wheel brake cylinder) that is output at the at least one wheel inlet valve.

As an example, it is recognized at a point in time t1 that executing the electronic brake force distribution function (as method step S3) is advantageous in order to prevent wheel locking, which otherwise is at risk. Therefore, beginning at point in time t1, the "left" rear wheel inlet valve and the "right" rear wheel inlet valve are switched in such a way that a greater increase in brake pressure occurs in the "left" front wheel brake cylinder and in the "right" front wheel brake cylinder, while there is little or no further increase in brake pressures $p_{RL}$ and $p_{RR}$ in the "left" rear wheel brake cylinder and in the "right" rear wheel brake cylinder (despite carrying out method step S1 without interruption). Overbraking of the rear axle may be prevented with the aid of the executed electronic brake force distribution function. The executed electronic brake force distribution function is also commonly referred to as the electronic brake force distribution (EBD) function or EBD control.

Likewise, it is recognized at a point in time t2 that executing the antilocking function (as method step S4) is advantageous in order to eliminate or prevent locking of the right front wheel. This takes place via a (slight) pressure drop in the "right" front wheel brake cylinder by appropriately switching the "right" front wheel inlet valve, followed by a slight pressure drop in the "left" front wheel brake cylinder by appropriately switching the "left" front wheel inlet valve. The antilocking function executed in each case may also be referred to as an antilock braking system (ABS) pressure drop or an ABS control.

The method described here also includes a method step S5 that is carried out, at least at times, when it is ascertained that wheel locking is present or at risk and/or when the electronic brake force distribution function (i.e., carrying out method step S3) and/or the antilocking function (i.e., carrying out method step S4) are/is executed. A counterforce on the brake actuating element acting against the actuation of the brake actuating element by the driver is temporarily/momentarily exerted or triggered in method step S5. Thus, despite the design of the at least one wheel brake cylinder without the force transmission connection to the brake actuating element, or despite the hydraulic decoupling of the at least one wheel brake cylinder from the brake actuating element that is present, the driver senses a "warning" regarding the wheel locking that is present or at risk, the executed electronic brake force distribution function, or the executed antilocking function. With the aid of feedback/pedal feedback that is enhanced in this way, the driver may be induced to adapt his/her actuation of the brake actuating element according to the situation. (Frequently, when counterforces are perceived, drivers temporarily forgo stepping on the brake pedal more forcefully.)

Method step S5 may include a substep S5a and/or a substep S5b: As substep S5a, the counterforce on the brake actuating element acting against the actuation of the brake actuating element by the driver is (at least partially) triggered by temporarily/momentarily opening the at least one shutoff valve situated/connected between the master brake cylinder and the at least one wheel brake cylinder. When it is ascertained that wheel locking is present or at risk and/or when the antilocking function and/or the electronic brake force distribution function are/is executed, substep S5a (i.e., temporarily/momentarily opening the at least one shutoff valve) may be carried out only if the at least one measured or estimated brake pressure $p_{FL}$, $p_{FR}$, $p_{RL}$, $p_{RR}$ in the at least one wheel brake cylinder of the hydraulic braking system is above a measured or estimated master brake cylinder pressure in the master brake cylinder.

As substep S5b, the counterforce on the brake actuating element acting against the actuation of the brake actuating element by the driver is (at least partially) triggered by temporarily/momentarily decoupling the simulator, into which the driver brakes by actuating the brake actuating element, from the brake actuating element. This may take place, for example, by temporarily/momentarily closing the simulator shutoff valve that is situated/connected between the master brake cylinder and the simulator.

The counterforce that is effectuated with the aid of method step S5 may last less than 2 seconds, in particular less than 1 second, which may be less than 500 milliseconds. This is easily implementable via an appropriate opening point in time of the at least one shutoff valve and/or an appropriate closing point in time of the simulator shutoff valve.

In one advantageous refinement of the method, an optional method step S6 is also carried out in which an actual value regarding an actuating speed of the actuation of the brake actuating element is ascertained during the actuation of the brake actuating element by the driver. In this case, method step S5 for exerting/triggering the counterforce on the brake actuating element acting against the actuation of the brake actuating element by the driver, when it is ascertained that wheel locking is present or at risk and/or when the electronic brake force distribution function and/or the antilocking function are/is executed, is carried out only if the ascertained actual value is within a predefined normal value range. For an ascertained actual value that is outside the predefined normal value range, an emergency and/or panic brake application may be assumed, during which the driver would not notice the counterforce or find it objectionable.

Figure 2:
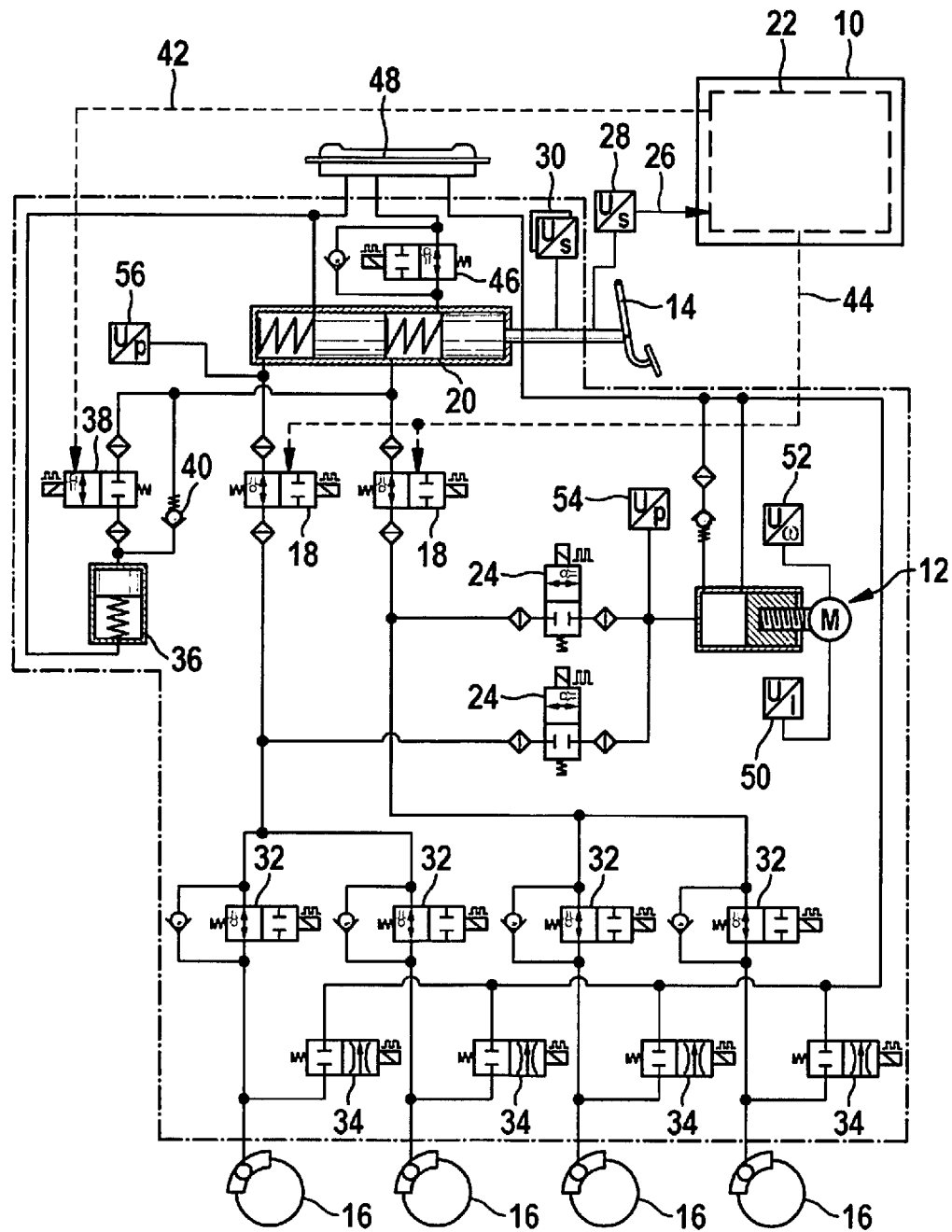
FIG. 2 shows a schematic illustration of one specific embodiment of the control device and the hydraulic braking system equipped with same.

FIG. 2 shows a schematic illustration of one specific embodiment of the control device and the hydraulic braking system equipped with same.

The hydraulic braking system schematically illustrated in FIG. 2 includes, in addition to control device 10, a motorized brake pressure buildup device 12, a brake actuating element 14, and at least one wheel brake cylinder 16. The at least one wheel brake cylinder 16 is hydraulically (actively) decoupleable from brake actuating element 14. As an example, the at least one wheel brake cylinder 16 is decoupleable from a master brake cylinder 20 to which the brake actuating element is (directly or indirectly) connected, and thus, from brake actuating element 14, by closing at least one first shutoff valve 18. However, it is pointed out that control device 10 may also advantageously cooperate with a hydraulic braking system that includes at least one wheel brake cylinder with a (structural) design that does not have a force transmission connection to brake actuating element 14. It is further pointed out that usability of the hydraulic braking system schematically illustrated in FIG. 2 is not limited to a specific type of vehicle/motor vehicle.

Control device 10 includes an electronic device 22 that is configured, during an actuation of brake actuating element 14 by a driver of the vehicle/motor vehicle, to control motorized brake pressure buildup device 12 in such a way that, with the aid of controlled motorized brake pressure buildup device 12, brake fluid is transferrable/transferred into the at least one wheel brake cylinder 16 that is hydraulically decoupled from brake actuating element 14, so that at least one brake pressure in the at least one wheel brake cylinder 16 is increasable/increased. As an example, motorized brake pressure buildup device 12 of the hydraulic braking system in FIG. 2 is a motorized piston-cylinder device (motorized plunger device). However, alternatively or additionally, motorized brake pressure buildup device 12 may include at least one pump/return pump. In addition, the connection of motorized brake pressure buildup device 12 to the at least one wheel brake cylinder 16, graphically depicted in FIG. 2, via at least one second shutoff valve 24 is to be interpreted strictly as an example.

Electronic device 22 may be configured for controlling the operation of motorized brake pressure buildup device 12 corresponding to a driver braking intent which is communicated with the aid of at least one sensor signal 26 and which the driver indicates by actuating brake actuating element 14. The at least one sensor signal 26 may be output to control device 10 by a rod travel sensor 28 and/or a differential travel sensor 30, for example.

Electronic device 22 is also configured for ascertaining whether wheel locking of at least one wheel (not illustrated) of the vehicle which is braked with the aid of the at least one wheel brake cylinder 16 is present or at risk. For example, this takes place by evaluating at least the at least one (estimated or measured) brake pressure in the at least one wheel brake cylinder 16. At least one pressure sensor that is suitable for measuring the at least one brake pressure may be additionally installed in the hydraulic braking system illustrated in FIG. 2.

Electronic device 22 is configured for executing an electronic brake force distribution function and/or an antilocking function when it is ascertained that wheel locking is present or at risk. The braking system in FIG. 2 has one wheel inlet valve 32 and one wheel outlet valve 34 for each wheel brake cylinder 16. Electronic device 22 is configured, for example, to reliably execute the electronic brake force distribution function and/or the antilocking function by switching/controlling wheel inlet valves 32.

In addition, electronic device 22 is configured for (at least at times) temporarily/momentarily effectuating a counterforce on brake actuating element 14 acting against the actuation of brake actuating element 14 by the driver when it is ascertained that wheel locking is present or at risk and/or when the electronic brake force distribution function and/or the antilocking function are/is executed. Thus, control device 10 and the hydraulic braking system equipped with same also result in the advantages described above.

In the braking system in FIG. 2, the counterforce on brake actuating element 14 acting against the actuation of brake actuating element 14 by the driver is at least partially triggerable by a design of electronic device 22 in which a simulator 36 is temporarily/momentarily decoupled from brake actuating element 14. As an example, for this purpose simulator 36 is connected to master brake cylinder 20 via a simulator shutoff valve 38 (and a pressure relief valve 40 situated in parallel to simulator shutoff valve 38). Simulator shutoff valve 38 is switchable by electronic device 20, with the aid of a first control signal 42, in such a way that simulator 36 is connectable/connected to master brake cylinder 20 (and to brake actuating element 14) by opening simulator shutoff valve 38, and the simulator is decoupleable/decoupled from master brake cylinder 20 (and from brake actuating element 14) by closing simulator shutoff valve 38. If simulator shutoff valve 38 is open, the driver brakes into simulator 36, via master brake cylinder 20 and open simulator shutoff valve 38, by actuating brake actuating element 14.

The driver, who has braked into simulator 36 beforehand, clearly perceives the decoupling of simulator 36 due to the closing of simulator shutoff valve 38.

In addition, electronic device 22 is configured for switching the at least one first shutoff valve 18, with the aid of at least one second control signal 44, in such a way that the at least one wheel brake cylinder 16 is decoupleable/decoupled from master brake cylinder 20 (and from brake actuating element 14) by closing the at least one first shutoff valve 18, and is coupleable/coupled to master brake cylinder 20 (and to brake actuating element 14) by opening the at least one shutoff valve 18. If the at least one brake pressure present in the at least one wheel brake cylinder 16 is greater than a master brake cylinder pressure present in master brake cylinder 20, the sudden coupling of the at least one wheel brake cylinder 16 by temporarily/momentarily opening the at least one shutoff valve (at least partially) triggers the counterforce on brake actuating element 14 acting against the actuation of brake actuating element 14 by the driver. Therefore, electronic device 22 may be also configured for temporarily/momentarily opening the at least one first shutoff valve 18, when it is ascertained that wheel locking is present or at risk and/or when the electronic brake force distribution function and/or the antilocking function are/is executed, only if the at least one estimated brake pressure (as a measured value or as an estimated value) in the at least one wheel brake cylinder 16 provided to electronic device 22 or provided by electronic device 22 is above the estimated master brake cylinder pressure (as a measured value or as an estimated value) in master brake cylinder 20 provided to electronic device 22 or provided by electronic device 22. In this way, a pressure drop in master brake cylinder 20 may be avoided by temporarily/momentarily opening the at least one first shutoff valve 18 when a master brake cylinder pressure is above the at least one brake pressure.

As one advantageous refinement, electronic device 22 may additionally be configured for effectuating the counterforce on brake actuating element 14, acting against the actuation of brake actuating element 14 by the driver, when it is ascertained that wheel locking is present or at risk and/or when the electronic brake force distribution function and/or the antilocking function are/is executed, only if an actual value (for example, derived from the at least one sensor signal 26) regarding an actuating speed of the actuation of brake actuating element 14 by the driver is within a predefined normal value range. The actual value may be a pedal travel gradient and/or a rod travel gradient, for example. The normal value range may be set in such a way that a pedal travel gradient and/or a rod travel gradient are/is less than a predefined limiting value, for example 150 millimeters/second (mm/s). For pedal travel gradients and/or rod travel gradients above the predefined limiting value, an emergency and/or panic brake application may be assumed. In this case, the driver would not notice the counterforce or find it objectionable. With the aid of the pedal travel gradient monitoring and/or rod travel gradient monitoring provided here, for pedal travel gradients and/or rod travel gradients in the normal value range it may also be assumed that the at least one brake pressure in the at least one wheel brake cylinder 16 is above the master brake cylinder pressure prevailing in master brake cylinder 20.

Control device 10 described here, by switching valves 18 and 38 in a targeted manner, allows triggering of the counterforce, which is perceivable to the driver during actuation of brake actuating element 14. The at least one first shutoff valve 18 may also be automatically temporarily/momentarily opened and simulator shutoff valve 38 is temporarily/momentarily closed when at least one of the wheel inlet valves 32 is closed for executing the electronic brake force distribution function and/or the antilocking function. The driver perceives the counterforce effectuated in this way as an abrupt increase in the driver braking force which he/she is to apply, and frequently responds with a (temporary) reduction in the driver braking force.

An opening point in time of the at least one first shutoff valve 18 effectuated with the aid of control device 10 and/or a closing point in time of simulator shutoff valve 38 effectuated with the aid of control device 10 are/may be less than 2 seconds, in particular less than 1 second, which may be less than 500 milliseconds. In addition, control device 10 may also be configured for carrying out at least one method step described above.

The hydraulic braking system illustrated in FIG. 2 also includes a brake fluid reservoir 48 that is connected to master brake cylinder 20 via a reservoir shutoff valve 46. In addition, a motor current sensor 50 of motorized brake pressure buildup device 12, a rotation angle sensor 52 of motorized brake pressure buildup device 12, a pressure sensor 54 of motorized brake pressure buildup device 12, and a pilot pressure sensor 56 are graphically illustrated in FIG. 2. However, equipping the hydraulic braking system with these components is optional.

What is claimed is:

1. A control device for a hydraulic braking system of a vehicle, comprising:
    an electronic device configured for performing the following:
        controlling a motorized brake pressure buildup device of the hydraulic braking system, during an actuation of a brake actuating element by a driver of the vehicle, so that brake fluid is transferable into at least one wheel brake cylinder that is configured without a force transmission connection to the brake actuating element, or is hydraulically decoupled from the brake actuating element, so that at least one brake pressure in the at least one wheel brake cylinder is increasable;
        ascertaining whether wheel locking of at least one wheel of the vehicle that is braked with the aid of the at least one wheel brake cylinder is present or at risk; and
        executing an electronic brake force distribution function and/or an antilocking function when it is ascertained that wheel locking is present or at risk;
    wherein the electronic device is configured for, at least at times, temporarily effectuating a counterforce on the brake actuating element acting against the actuation of the brake actuating element by the driver when it is ascertained that wheel locking is present or at risk and/or when the electronic brake force distribution function and/or the antilocking function are/is executed;
    wherein the electronic device is configured for effectuating the counterforce on the brake actuating element, acting against the actuation of the brake actuating element by the driver, when it is ascertained that wheel locking is present or at risk and/or when the electronic brake force distribution function and/or the antilocking function are/is executed, only if an actual value regarding an actuating speed of the actuation of the brake actuating element by the driver is within a predefined normal value range.

2. The control device of claim 1, wherein the counterforce on the brake actuating element acting against the actuation of the brake actuating element by the driver is at least partially triggerable by the electronic device in which a simulator is temporarily decoupleable from the brake actuating element.

3. The control device of claim 1, wherein the electronic device is configured for switching at least one shutoff valve of the hydraulic braking system so that the at least one wheel brake cylinder is decoupleable from a master brake cylinder to which the brake actuating element is directly or indirectly connected, and from the brake actuating element, by closing the at least one shutoff valve, and that the counterforce on the brake actuating element acting against the actuation of the brake actuating element by the driver is at least partially triggerable by temporarily opening the at least one shutoff valve.

4. The control device of claim 3, wherein the electronic device is configured for temporarily opening the at least one first shutoff valve, when it is ascertained that wheel locking is present or at risk and/or when the electronic brake force distribution function and/or the antilocking function are/is executed, only if the at least one estimated brake pressure in the at least one wheel brake cylinder of the hydraulic braking system, provided to the electronic device or provided by the electronic device, is above an estimated master brake cylinder pressure in the master brake cylinder provided to the electronic device or provided by the electronic device.

5. A hydraulic braking system for a vehicle, comprising:
    a motorized brake pressure buildup device;
    a brake actuating element; and
    a control device for the hydraulic braking system of the vehicle, including an electronic device configured for performing the following:
        controlling the motorized brake pressure buildup device of the hydraulic braking system, during an actuation of the brake actuating element by a driver of the vehicle, so that brake fluid is transferable into at least one wheel brake cylinder that is configured without a force transmission connection to the brake actuating element, or is hydraulically decoupled from the brake actuating element, so that at least one brake pressure in the at least one wheel brake cylinder is increasable;

ascertaining whether wheel locking of at least one wheel of the vehicle that is braked with the at least one wheel brake cylinder is present or at risk; and executing an electronic brake force distribution function and/or an antilocking function when it is ascertained that wheel locking is present or at risk;

wherein the electronic device is configured for, at least at times, temporarily effectuating a counterforce on the brake actuating element acting against the actuation of the brake actuating element by the driver when it is ascertained that wheel locking is present or at risk and/or when the electronic brake force distribution function and/or the antilocking function are/is executed, and wherein the at least one wheel brake cylinder is configured without the force transmission connection to the brake actuating element, or is hydraulically decoupleable from the brake actuating element;

wherein the electronic device is configured for effectuating the counterforce on the brake actuating element, acting against the actuation of the brake actuating element by the driver, when it is ascertained that wheel locking is present or at risk and/or when the electronic brake force distribution function and/or the antilocking function are/is executed, only if an actual value regarding an actuating speed of the actuation of the brake actuating element by the driver is within a predefined normal value range.

6. A method for operating a hydraulic braking system of a vehicle, the method comprising:

increasing at least one brake pressure in at least one wheel brake cylinder of the hydraulic braking system during an actuation of a brake actuating element by a driver of the vehicle by transferring brake fluid into the at least one wheel brake cylinder that is configured without a force transmission connection to the brake actuating element, or that is hydraulically decoupleable from the brake actuating element, with the aid of a motorized brake pressure buildup device of the hydraulic braking system;

ascertaining whether wheel locking of at least one wheel of the vehicle that is braked with the aid of the at least one wheel brake cylinder is present or at risk;

executing an electronic brake force distribution function and/or an antilocking function if it is ascertained that wheel locking is present or at risk; and temporarily exerting or triggering, at least at times, a counterforce on the brake actuating element acting against the actuation of the brake actuating element by the driver when it is ascertained that wheel locking is present or at risk and/or when the electronic brake force distribution function and/or the antilocking function is executed;

wherein an actual value regarding an actuating speed of the actuation of the brake actuating element is ascertained during the actuation of the brake actuating element by the driver, and when it is ascertained that wheel locking is present or at risk and/or if the electronic brake force distribution function and/or the antilocking function are/is executed, the counterforce on the brake actuating element acting against the actuation of the brake actuating element by the driver is exerted or triggered only if the ascertained actual value is within a predefined normal value range.

7. The method of claim 6, wherein the counterforce on the brake actuating element acting against the actuation of the brake actuating element by the driver is at least partially triggered by temporarily decoupling a simulator, into which the driver brakes by actuating the brake actuating element, from the brake actuating element.

8. The method of claim 6, wherein prior to transferring brake fluid with the aid of the motorized brake pressure buildup device, the at least one wheel brake cylinder is decoupled from the master brake cylinder, into which the driver brakes by actuating the brake actuating element, and from the brake actuating element, by closing at least one shutoff valve, and the counterforce on the brake actuating element acting against the actuation of the brake actuating element by the driver is at least partially triggered by temporarily opening the at least one shutoff valve.

9. The method of claim 8, wherein when it is ascertained that wheel locking is present or at risk and/or when the electronic brake force distribution function and/or the antilocking function are/is executed, the at least one shutoff valve is temporarily opened only if the at least one ascertained or estimated brake pressure in the at least one wheel brake cylinder of the hydraulic braking system is above an ascertained or estimated master brake cylinder pressure in the master brake cylinder.

\* \* \* \* \*